United States Patent [19]

Cicciari et al.

[11] Patent Number: 5,536,432
[45] Date of Patent: Jul. 16, 1996

[54] PROCESS FOR THE PRODUCTION OF A DETERGENT COMPOSITION

[75] Inventors: Craig Cicciari, Ramsey, N.J.; Cornelis E. Van Lare, Vlaardingen, Netherlands

[73] Assignee: Lever Brothers Company, Division of Conopco, Inc., New York, N.Y.

[21] Appl. No.: 333,102

[22] Filed: Nov. 1, 1994

[30] Foreign Application Priority Data

Nov. 2, 1993 [GB] United Kingdom ............... 9322530

[51] Int. Cl.$^6$ .............................. C11D 11/00; C11D 1/83; C11D 33/95
[52] U.S. Cl. ........................... 510/377; 23/FB; 510/315; 510/457; 510/444; 510/351
[58] Field of Search .............................. 252/89.1, 174, 252/95, 550, 531, 174.25; 23/313 FB, 313 R

[56] References Cited

U.S. PATENT DOCUMENTS

| | | | |
|---|---|---|---|
| 3,588,950 | 6/1971 | Marshall | 18/2.5 |
| 3,615,723 | 10/1971 | Meade | 99/206 |
| 3,714,051 | 1/1973 | Milesi et al. | 252/135 |
| 4,247,991 | 2/1981 | Mehta | 34/35 |
| 4,464,281 | 8/1984 | Rapisarda et al. | 252/174.21 |
| 4,751,015 | 6/1988 | Humphreys et al. | 252/99 |
| 4,818,426 | 4/1989 | Humphreys et al. | 252/99 |
| 4,828,721 | 5/1989 | Bollier et al. | 252/8.7 |
| 4,894,117 | 1/1990 | Bianchi et al. | 159/49 |
| 4,970,017 | 11/1990 | Nakamura et al. | 252/174.13 |
| 5,100,510 | 3/1992 | Bianchi et al. | 159/6.3 |
| 5,211,985 | 5/1993 | Shirley, Jr. et al. | 427/213 |

FOREIGN PATENT DOCUMENTS

| | | |
|---|---|---|
| 0164514 | 12/1985 | European Pat. Off. . |
| 0284292 | 9/1988 | European Pat. Off. . |
| 0303520 | 2/1989 | European Pat. Off. . |
| 0340966 | 11/1989 | European Pat. Off. . |
| 0340013 | 11/1989 | European Pat. Off. . |
| 0367339 | 5/1990 | European Pat. Off. . |
| 0384070 | 8/1990 | European Pat. Off. . |
| 0390251 | 10/1990 | European Pat. Off. . |
| 0402971 | 12/1990 | European Pat. Off. . |
| 0420317 | 4/1991 | European Pat. Off. . |
| 0458398 | 11/1991 | European Pat. Off. . |
| 0458397 | 11/1991 | European Pat. Off. . |
| 0509787 | 10/1992 | European Pat. Off. . |
| 55-003468 | 1/1980 | Japan . |
| 1437950 | 6/1976 | United Kingdom . |
| 1470250 | 4/1977 | United Kingdom . |
| 1473201 | 5/1977 | United Kingdom . |
| 1473202 | 5/1977 | United Kingdom . |
| WO92/01036 | 1/1992 | WIPO . |

*Primary Examiner*—Paul Lieberman
*Assistant Examiner*—Lorna M. Douyon
*Attorney, Agent, or Firm*—Rimma Mitelman

[57] ABSTRACT

A process for the production of a detergent composition having a predetermined relative humidity comprising forming a crude detergent composition having a relative humidity in excess of the predetermined level, for example in excess of 30% and contacting the said crude composition with a preconditioned gas having a relative humidity below the predetermined relative humidity wherein the temperature of the crude composition is maintained below the temperature at which the crude composition agglomerates thereby to form a low relative humidity detergent composition.

8 Claims, No Drawings

PROCESS FOR THE PRODUCTION OF A DETERGENT COMPOSITION

This invention relates to a process for the production of a detergent composition in particular to a process for the production of a detergent composition having a low relative humidity in which pre-conditioned gas is employed.

Detergent compositions may be produced by a variety of processes including spray-drying an aqueous slurry of detergent composition components to produce a spray-dried powder, mechanically mixing the components of the composition (non-tower process) and a process in which a spray-dried powder is subjected to a mechanical mixing process wherein other components may be incorporated if desired (tower/post-tower process). Detergent compositions produced by any of these processes typically contain water and may have a relative humidity in excess of 40% due to, for example, the presence of zeolites in the composition which have relatively high levels of mobile water and the presence of water in the spray-drying process or surfactant raw materials.

It is also known to include a further step in the production process which involves passing the detergent composition through a fluid-bed. This further step is typically employed in order to cool the composition and/or reduce the moisture content of the composition by drying at elevated temperature. Drying the composition may reduce the effects of problems such as poor handling and storage which may be encountered with powders which have a significant moisture content. Moreover, the presence of significant levels of moisture present particular difficulties where the composition comprises moisture sensitive components for example peroxy bleach components.

However, at elevated operating temperatures the drying and/or cooling apparatus, for example a fluid-bed, may themselves introduce problems into the detergent production process. For example undesirable agglomeration of the product and fouling of the apparatus may occur which may decrease the efficiency of the process and in extreme cases require the process to be interrupted (where a continuous process is employed) to permit cleaning of the fouled apparatus in the case of a fluid bed or the bed may collapse.

The problem exists therefore that elevated temperatures are required to produce a low relative humidity product but operation at elevated temperature introduces significant processing problems.

We have now surprisingly found that a detergent composition having a relatively low humidity may be produced whilst the afore-mentioned drawbacks encountered with the drying and/or cooling apparatus may be reduced or eliminated by employing a pre-conditioned gas.

Accordingly, a first aspect of the invention provides a process for the production of a detergent composition having a predetermined relative humidity comprising forming a crude detergent composition having a relative humidity in excess of the predetermined level, for example in excess of 30% and contacting the said crude composition with a pre-conditioned gas having a relative humidity below the predetermined relative humidity wherein the temperature of the crude composition is maintained below the temperature at which the crude composition agglomerates thereby to form a low relative humidity detergent composition.

The invention also provides for the use of a preconditioned gas in process for producing a detergent composition having a low relative humidity, which process comprises producing a crude detergent composition feeding the crude composition to a drying apparatus in which the preconditioned gas and crude composition are contacted to reduce the relative humidity of the crude composition and maintaining the temperature of the composition below that at which it agglomerates thereby to produce the low relative humidity detergent composition.

By "pre-conditioned gas" we mean a gas which has been treated prior to contact with the crude composition to reduce its relative humidity to a level below the ambient humidity and below the relative humidity of the predetermined level. Such treatment may be by any drying method known to those skilled in the art. Preferably the pre-conditioned gas has a humidity not in excess of 0.015, more preferably not in excess of 0.010 and particularly not in excess of 0.008, for example 0.007 kg of water per kg of dry gas.

In the context of the present invention, the term "crude" refers to a composition having an undesirably high relative humidity and does not imply that impurities other than water are necessarily present.

Agglomeration may occur at high composition temperatures due to components of the composition becoming sticky or more fluid causing particles of the crude composition to associate into a larger mass. This is to be distinguished from deposition of the crude particles of the composition in the process wherein such aggregation does not occur to a significant extent.

The use of a preconditioned gas to produce a low relative humidity composition permits the composition to be dried at a lower temperature than if ambient humidity gas is employed. Consequently the composition is less prone to agglomeration.

The invention also provides for the use of a preconditioned gas in a process for producing a detergent composition according to the invention to inhibit agglomeration of the composition.

This provides the practical advantage that, fouling of the drying apparatus is significantly reduced thereby reducing process downtime. Moreover, greater formulation flexibility is possible insofar as higher levels of those components which cause agglomeration may be employed.

The dispensing properties of a composition are generally improved if the composition contains a low level of fine particles (less than 180 microns). This is especially the case for powders having a high bulk density.

Elutriation of fine material in the composition, that is particles having a particle size of less than 180 μ, in the drying apparatus may be effected by contact with a preconditioned gas.

The invention further provides a method of reducing the level of fine particles (less than 180 μ) in a detergent composition which comprises feeding the composition to a drying zone, contacting the composition with a stream of preconditioned gas to reduce the relative humidity of the composition, effecting separation of a stream of fine particle having a low relative humidity from the composition, to produce a low relative himidity composition having a low level of fine particles.

Suitably the direction of flow of the composition and the said gas stream in the drying zone are different, they impinge at an angle and enable the stream of fine material to be separated from the remainder of the composition.

The preconditioned gas provides effective drying at a lower temperature and so the composition particles have a low 'stickiness'. The fine material is suitably recycled upstream to increase the overall process yield and provide improved control over the particle size distribution of the final product.

The level of fine particles is preferably less than 10% and more preferably less than 5% by weight of the composition.

Suitably, the crude detergent composition is contacted with the pre-conditioned gas in a fluid bed.

A further aspect of the invention provides a process for the production of detergent composition having a predetermined relative humidity comprising forming a crude detergent composition having a relative humidity in excess of the predetermined level, for example in excess of 30%, feeding the said composition into a fluid bed, contacting the said composition with a pre-conditioned gas in the fluid bed which gas has a relative humidity below the predetermined relative humidity wherein the crude composition is maintained at a temperature below that temperature at which it agglomerates thereby to form a low relative humidity detergent composition.

The low relative humidity composition is suitably admixed with further components in order to provide a fully formulated composition. Relative humidity is a measurement of the water activity in a solid material. It is the ratio of the current-water concentration in the air in equilibrium with the composition (kg water/kg air) to the maximum at a given temperature and pressure expressed as a percentage of the value for saturated air. All relative humidity values quoted herein are under conditions of 1 atmosphere and 20° C. using a Novasina relative humidity meter unless otherwise stated.

The relative humidity of the composition produced by a process according to the invention will generally be selected depending on the stability to moisture of the further components which are to be admixed. Whilst the relative humidity is desirably as low as possible for the stability of any moisture sensitive components, this should, nevertheless, be balanced against process drawbacks for example increased production costs. Preferably, the low relative humidity composition has a relative humidity not in excess of 20% and more preferably not in excess of 10% measured at 20° C. using a Novasina relative humidity meter.

According to a further aspect of the invention there is provided a detergent composition having a relative humidity not in excess of 10% and preferably not in excess of 5% at a temperature of 20° C. Preferably the composition is produced by a process according to the invention.

Detergent compositions having a low relative humidity are advantageous as a base composition with which to admix moisture-sensitive components as improved stability of the moisture sensitive components is secured. This has the practical benefit of permitting a longer storage time for the final product and reducing the requirement for admixing excess quantities of moisture sensitive components to take account of decomposition in storage thus ensuring the correct level of the component at the point of use.

It is required that the crude composition is maintained at a temperature below that at which the crude composition agglomerates. A lower temperature is desirable to reduce processing problems. It is preferred that the temperature of the composition during drying is not in excess of 75° C., more preferably not in excess of 60° C. and especially not in excess of 50° C. It is preferred that the temperature of the crude composition is in excess of 40° C. to provide for efficient drying. Generally the drying temperature which is acceptable is dependent on the formulation of the crude composition. A composition comprising alkyl sulphate, for example primary alkyl sulphate (PAS), nonionic active and zeolite builder is suitably maintained below 50° C. to reduce and preferably avoid agglomeration.

Whilst it is necessary to ensure that agglomeration does not occur the pre-conditioned gas may be introduced at a temperature above that of the crude composition in order to effect more efficient drying of the composition provided that the temperature of the crude composition remains below that at which it agglomerates. Suitably the gas is at a temperature not in excess of 130° C. and preferably not in excess of 95° C. and desirably not in excess of 75° C. By employing pre-conditioned gas it is possible to reduce the temperature at which the gas and crude composition are contacted in order to obtain a composition of low relative humidity thus reducing processing difficulties.

The gas serves to dry the crude composition and as such the particular gas employed is not critical although it should be inert, Nitrogen may be employed. Air is preferred for ease and economic reasons.

Suitably the gas velocity is in the range 0.3 to 1.5 m/s, preferably 0.5 to 1.0 and more preferably 0.6 to 0.8 m/s. The gas velocity is selected to provide efficient drying without removal of significant levels of fine particles of the crude composition and will be selected according to the size of particles to be dried.

The area of the fluid bed is selected according to the desired rate of throughput of the crude composition, the desired drying capacity and economic considerations.

The process of the present invention may be batch or continuous as desired.

Following drying, the crude composition may be cooled if desired prior to admixture with further components. Suitably the cooling if present, is conducted in a fluid bed. Preferably the composition is cooled to a temperature not in excess of 40° C. For example cooling to 37° C. provides a composition which is sufficiently cool for storage and compatible with admixed heat-sensitive components thus facilitating immediate admixture of the composition and such components and immediate packaging of the fully formulated product if desired. Preferred compositions have a relative humidity not in excess of 20% and desirably not in excess of 10% at 20° C. thus both moisture-sensitive and heat-sensitive components may be admixed to the composition.

The gas employed in a cooling step suitably has a relative humidity lower than that employed in the drying step. The cooling gas is suitably at a much lower temperature than the drying gas preferably from 0° to 40° C. and more preferably from 5° to 30° C.

As an example of suitable throughput and fluid bed area, a low relative humidity composition may be secured with a throughput of 25000 kg/hour of crude composition over a fluid bed of 20 m$^2$ in a drying step and, if present, a fluid bed of 8 m$^2$ in a cooling step with a gas flow of 0.6 m/s.

Compositions produced according to the present invention will generally contain surfactants (detergent-active compounds) and detergency builders, and may optionally contain bleaching components and other active ingredients to enhance performance and properties.

The crude composition which is to be treated with preconditioned gas suitably comprises moisture and heat-insensitive components and typically comprises a surfactant and a detergency builder. Moisture or heat sensitive components are suitably admixed with the low relative humidity composition.

A further aspect of the invention provides a process for the production of a low relative humidity detergent composition which comprises mixing a surfactant and a builder, at least one of which contains water which may be free or bound, for example a zeolite builder, to form a particulate solid, densifying the particulate solid to form a crude detergent composition, contacting the crude composition with a pre-conditioned gas, preferably in a fluid bed, wherein the crude composition is maintained at a temperature below that at which it agglomerates, preferably below 50° C., whereby sufficient water is removed from the crude composition to provide a composition having a relative humidity not in excess of 30%, preferably not in excess of 10%, at 20° C.

The surfactants may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds.

Anionic surfactants are well-known to those skilled in the art. Examples include alkylbenzene sulphonates, particularly linear alkylbenzene sulphonates having an alkyl chain length of $C_8$–$C_{15}$; primary and secondary alkyl sulphates, particularly $C_{12}$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Nonethoxylated nonionic surfactants include alkylpolyglycosides also glycerol monoethers, and polyhydroxyamides (glucamide).

The choice of detergent-active compound (surfactant), and the amount present, will depend on the intended use of the detergent composition. For example, for machine dishwashing a relatively low level of a low-foaming nonionic surfactant is generally preferred. In fabric washing compositions, different surfactant systems may be chosen, as is well known to the skilled formulator, for handwashing products and for products intended for use in different types of washing machine.

The total amount of surfactant present will also depend on the intended end use and may be as low as 0.5 wt. %, for example, in a machine dishwashing composition, or as high as 60 wt. %, for example, in a composition for washing fabrics by hand. In compositions for machine washing of fabrics, an amount of from 5 to 40 wt. % is generally appropriate.

Detergent compositions suitable for use in most automatic fabric washing machines generally contain anionic non-soap surfactant, or nonionic surfactant, or combinations of the two in any ratio, optionally together with soap.

The crude composition will generally also contain one or more detergency builders. The total amount of detergency builder in the compositions will suitably range from 10 to 80 wt. %, preferably from 15 to 60 wt. %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel),. amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate, may also be present, but on environmental grounds those are no longer preferred. An especially preferred builder comprises a silicate, preferably a crystalline layered silicate, and a zeolite and optionally a salt, for example citrate.

Zeolite builders may suitably be present in amounts of from 10 to 45 wt. %, amounts of from 15 to 35 wt. % being especially suitable for (machine) fabric washing compositions. The zeolite used in most commercial particulate detergent compositions is zeolite A. Advantageously, however, maximum aluminium zeolite P (zeolite MAP) described and claimed in EP 384 070A (Unilever) may be used. Zeolite MAP is an alkali metal aluminosilicate of the P type having a silicon to aluminium ratio not exceeding 1.33, preferably not exceeding 1.15, and more preferably not exceeding 1.07.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, nitrolotriacetic acid and oxydisuccinate and are suitably used in amounts of from 5 to 30 wt. %, preferably from 10 to 25 wt. %; and acrylic polymers, more especially acrylic/maleic copolymers, suitably used in amounts of from 0.5 to 15 wt. %, preferably from 1 to 10 wt. %.

Builders, both inorganic and organic, are preferably present in alkali metal salt, especially sodium salt, form.

The crude detergent composition is suitably produced by a spray-dry method, a tower/post tower method or preferably a non tower method. The non tower method is particularly useful where a detergent composition having a high bulk density is required. The crude composition may be produced by a non tower granulation process, for example as described in EP 340 013, EP 367339, EP 390351 and EP 420317 (Unilever)

Where a continuous granulation process is employed to produce the crude composition mixing and densification steps may be carried out simultaneously using a high speed mixer, suitable examples include a Schugi (trademark) Granulator, a Drais (trade mark) K-TTP 80 Granulator and the Lodige (trade mark) CB30 recycler. The residence time in the mixing step is suitably about 5 to 30 seconds and the rate of mixing in the apparatus is suitably in the range 100 to 2500 rpm depending upon the degree of densification and the particle size required. A granulation step may be employed if desired and may be carried out using a lower speed mixer for example, the Drais (trade mark) K-T 160 and the Lodige (trade mark) KM300 mixer. The residence time in the granulation step is suitably about 1 to 10 minutes and the rate of mixing in the apparatus is about 40 to 160 rpm.

Detergent compositions produced by the process of the invention are preferably admixed with a bleach system. Machine dishwashing compositions may suitably contain a chlorine bleach system, while fabric washing compositions may more desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

The peroxy bleach compound is suitably present in an amount of from 5 to 35 wt. %, preferably from 10 to 25 wt. %.

The peroxy bleach compound may be used in conjunction with a bleach activator (bleach precursor) to improve bleaching action at low wash temperatures. The bleach precursor is suitably present in an amount of from 1 to 8 wt. %, preferably from 2 to 5 wt. %.

Preferred bleach precursors are peroxycarboxylic acid precursors, more especially peracetic acid precursors and peroxybenzoic acid precursors; and peroxycarbonic acid precursors. An especially preferred bleach precursor suitable for use in the present invention is N,N,N',N'-tetracetyl ethylenediamine (TAED).

The novel quaternary ammonium and phosphonium bleach precursors disclosed in U.S. Pat. No. 4,751,015 and U.S. Pat. No. 4,818,426 (Lever Brothers Company) and EP 402 971A (Unilever) are also of great interest. Especially preferred are peroxycarbonic acid precursors, in particular cholyl-4-sulphophenyl carbonate. Also of interest are peroxybenzoic acid precursors, in particular, N,N,N-trimethylammonium toluoyloxy benzene sulphonate; and the cationic bleach precursors disclosed in EP 284 292A and EP 303 520A (Kao).

A bleach stabiliser (heavy metal sequestrant) may also be present. Suitable bleach stabilisers include ethylenediamine tetraacetate (EDTA) and the polyphosphonates such as Dequest (Trade Mark), EDTMP.

An especially preferred bleach system comprises a peroxy bleach compound (preferably sodium percarbonate optionally together with a bleach activator), and a transition metal bleach catalyst as described and claimed in EP 458 397A, EP 458 398A and EP 509 787A (Unilever).

Detergent compositions produced in the present invention may contain alkali metal, preferably sodium, carbonate, in order to increase detergency and ease processing. Sodium carbonate may suitably be present in amounts ranging from 1 to 60 wt. %, preferably from 2 to 40 wt. %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate polymer, or sodium silicate.

One preferred powder structurant is fatty acid soap, suitably present in an amount of from 1 to 5 wt. %.

Other materials that may be present include sodium silicate and sodium metasilicate; antiredeposition agents such as cellulosic polymers; fluorescers; inorganic salts such as sodium sulphate; lather control agents or lather boosters as appropriate; proteolytic and lipolytic enzymes; dyes; coloured speckles; perfumes; foam controllers; and fabric softening compounds. This list is not intended to be exhaustive.

The invention is illustrated by the following non-limiting Example.

EXAMPLE

A crude detergent composition was prepared by granulation in a non tower process. The composition had a bulk density in excess of 850 g/l and had the following composition (figures are parts by weight):

| | |
|---|---|
| Na PAS | 5.2 |
| Nonionic surfactant | 11.7 |
| Soap | 1.9 |
| Zeolite 4A (anhydrous) | 32.0 |
| Na Carbonate | 10.0 |
| Water | 9.7 |

This crude composition was fed to a fluid bed drier having a surface area of 0.53 m$^2$ (drying backmixing) and 0.53 m$^2$ (drying plug flow) at a rate of 1100 kg/hr, its temperature was maintained below 50° C. The composition was contacted with air having a velocity of 0.6 m/s, temperature of 70° C. and a humidity below 0.0050 kg water/kg. The residence time of the composition in the fluid bed was 15 minutes. The composition passed from the drying step to a cooling step (fluid bed area 0.53 m$^2$) in which it was cooled from about 50° C. to a temperature in the range 30° to 40° C. using air having a temperature of 5° C.

RESULTS

A composition having a relative humidity of less than 10% was obtained and visual inspection showed there was no significant agglomeration or fouling in the fluid bed likely to cause detrimental performance of the bed thus demonstrating that the process of the present invention permits the production of a low relative humidity detergent composition using a fluid bed without the bed fouling.

We claim:

1. A process for the production of a low relative humidity detergent composition, the process comprising the steps of:
   (a) forming a crude detergent composition having a relative humidity in excess of 20% at 20° C., the crude composition comprising from 0.5 to 60 wt. % of an anionic and nonionic surfactant mixture and from 10 to 45 wt. % of a zeolite;
   (b) feeding the crude composition into a fluid bed; and
   (c) contacting the crude composition in the fluid bed with a gas having a humidity not in excess of 0.015 g H$_2$O/g dry air and having a relative humidity below 20% at 20° C., while maintaining the crude composition at a temperature not in excess of 75° C., to obtain the detergent composition having a relative humidity not in excess of 20% at 20° C. wherein the relative humidity of both said crude composition and said detergent composition is measured as the ratio of the current water concentration in the air in equilibrium with said composition at a given temperature and pressure expressed as a percentage of the value for saturated air.

2. A process according to claim 1 in which the gas in step (c) is at a temperature not in excess of 130° C.

3. A process according to claim 1 in which the anionic surfactant in the crude detergent composition in step (a) is a primary alkyl sulfate surfactant.

4. A process of claim 1 wherein the relative humidity of the detergent composition obtained in step (c) is not in excess of 10% of 20° C.

5. A process according to claim 1 further comprising a step of separating a stream of fine particles from the low relative humidity composition to obtain a low relative humidity composition having a low level of fine particles.

6. A process of claim 1 further comprising admixing a moisture sensitive ingredient to the low relative humidity detergent composition.

7. A process of claim 6 wherein the moisture sensitive ingredient is a percarbonate bleach.

8. A detergent composition obtained by the process according to claim 1.

\* \* \* \* \*